United States Patent [19]

Hatfield

[11] Patent Number: 4,566,977
[45] Date of Patent: Jan. 28, 1986

[54] NON-AQUEOUS SLURRIES USED AS THICKENERS

[75] Inventor: James C. Hatfield, St. Albans, W. Va.

[73] Assignee: Union Carbide Corporation, Danbury, Conn.

[21] Appl. No.: 706,725

[22] Filed: Feb. 28, 1985

Related U.S. Application Data

[63] Continuation of Ser. No. 391,954, Jun. 24, 1982, abandoned, which is a continuation of Ser. No. 190,906, Sep. 25, 1980, abandoned.

[51] Int. Cl.$^4$ ............... C09K 7/02; E21B 43/00
[52] U.S. Cl. ..................... 252/8.5 C; 252/8.5 A; 252/8.55 R; 252/363.5; 536/87
[58] Field of Search ............ 252/8.5 A, 8.5 C, 8.5 P, 252/8.55 R, 363.5; 536/87, 96

[56] References Cited

U.S. PATENT DOCUMENTS

| 3,122,203 | 2/1964 | Hawkins | 252/8.55 |
| 3,852,201 | 12/1974 | Jackson | 252/8.5 |
| 3,960,736 | 6/1976 | Free et al. | 252/326 X |
| 4,040,967 | 8/1977 | Nimerick et al. | 252/363.5 X |
| 4,325,861 | 4/1982 | Braun et al. | 523/205 |
| 4,330,414 | 5/1982 | Hoover | 252/8.55 X |

OTHER PUBLICATIONS

"K 8D30-A Fine Mesh Biopolymer for Liquid Viscosifier", Published by Kelco, Division of Merck & Co., Inc., 4-1979.

Primary Examiner—Herbert B. Guynn
Attorney, Agent, or Firm—Henry H. Gibson

[57] ABSTRACT

Described herein is an improved non-aqueous slurry suitable for use as a thickener or viscosifier in oil or gas drilling, fracturing, flow diversion, completion or workover fluids, which slurry comprises a water-soluble cellulose ether polymer, a water-insoluble liquid hydrocarbon, a non-ionic surfactant having an HLB of from about 7 to about 14, and an organo modified clay.

24 Claims, No Drawings

NON-AQUEOUS SLURRIES USED AS THICKENERS

This application is a continuation of application Ser. No. 391,954, filed June 24, 1982, which is a continuation of application Ser. No. 190,906, filed Sept. 25, 1980, both now abandoned.

BACKGROUND OF THE INVENTION

This invention is directed to an improved nonaqueous slurry suitable for use as a thickener or viscosifier in oil or gas drilling, fracturing, flow diversion, completion or workover fluids, which slurry comprises a water-soluble cellulose ether polymer, a water-insoluble liquid hydrocarbon, a non-ionic surfactant having an HLB of from about 7 to about 14, and an organo modified clay. The slurry may include a thermal stabilizer. Additionally, this invention is directed to a process for thickening oil or gas drilling, fracturing, flow diversion, completion or workover fluids which comprises adding thereto the non-aqueous slurry as heretofore described.

Many polymeric containing formulations suitable for use as thickeners in oil or gas drilling, fracturing, flow diversion, completion or workover fluids are not storage stable over long periods of time. Therefore, the ingredients are supplied in a dry state. When the polymer, for example, hydroxyethyl cellulose, is added to an oil field brine, many complications due to lumps of unhydrated polymer, commonly known as "fish-eyes" can occur. Fish-eyes can cause well damage by plugging perforations or plating out on the formation during open hole operations. Lumps or fish-eyes also form during the addition of dry polymers to water because the polymer molecules are not adequately dispersed before they begin to hydrate. Once the outer layer of the polymer is hydrated, the fish-eyes cannot be dispersed. The only way to insure rapid and complete yielding of the polymer is to disperse the polymer particles before hydration begins.

Due to such problems, the trend in the industry has been toward a liquid dispersion containing a polymeric viscosifier in a dispersed unhydrated state. The liquid viscosifiers are highly desirable in drilling, workover, completion and fracturing fluid applications where inadequate polymer mixing equipment exists.

A produce announcement titled "K 8D30—A fine-mesh biopolymer for liquid viscosifiers" (published by Kelco, Division of Merck & Co., Inc., dated 4/79) describes a liquid viscosifier containing a high molecular weight biopolymer. This publication describes that if the polymer is dispersed in an oil prior to addition to the aqueous fluid, the problems with lumping, fish eyes, etc. are basically eliminated. Two formulations are described in the publication. A formulation which contains a low biopolymer concentration (30%) includes mineral oil, organophilic clay, surfactant (Tergitol 15-S-3) and biopolymer. A high biopolymer concentration (50%) formulation includes lauryl alcohol, methanol, hydroxypropyl cellulose, kerosene, lecithin, and biopolymer. This publication further states that the mineral oil can be substituted with vegetable oil or animal oils that have a viscosity of at least 100 centipoise. Also, the publication states that the organophilic clay is not required at biopolymer concentrations of less than 30%. Further, the publication states that the surfactant aids in dispersion of the slurry when added to water and that other ethoxylated linear alcohols can be substituted for the Tergitol surfactant.

U.K. Patent Application No. 2000799A describes compositions suitable for use in the preparation of cellulose ether-containing drilling fluids. These compositions are concentrated liquids used as rapidly dissolving thickeners. Said U.K. Application describes that when drilling for oil or natural gas, use may be made in a particular oil sand of a drilling fluid to which the composition has been added either previously during the preparation of the drilling fluid or in the well during the drilling process. The compositions are described as containing 2 to 65% of a water-soluble cellulose ether; 30–95% of a water miscible glycol ether and 0.5–40% of water, with the percentage of water being less than that of the water-miscible glycol ether. This U.K. Application states that the composition can also contain bentonite clay in an amount which is 2 to 30% of the sum of the amounts by weight of cellulose ether, glycol ether and water. Additionally, the U.K. Application states that the compositions can contain a petroleum product boiling within the range of 150° to 400° C. in an amount which is from 30 to 150% by weight of the total weight of cellulose ether, glycol ether and water. Examples 5 to 8 of the U.K. Application describe compositions containing fuel oil, clay, glycol ether, cellulose ether and small amounts of water. However, this patent does not disclose the use of a non-ionic surfactant in the compositions.

A commercially available liquid slurry (Liqui-Vis sold by NL Baroid Company) used as a thickener contains hydroxyethyl cellulose, a water-insoluble liquid hydrocarbon (diesel oil), clay, and an anti-foam agent.

U.S. patent application Ser. No. 136,762 filed Apr. 3, 1980, titled "Rapidly Dissolved Water-Soluble Polymer Composition", now U.S. Pat. No. 4,325,861 (Braun et al.), describes water-soluble polymers rapidly dissolved by employing a concentrate of (a) a water-soluble particulate polymer, (b) a water-insoluble organic vehicle which is a non-solvent for the polymer, (c) an inert, nonionic surfactant agent compatible with the organic vehicle in sufficient amounts to remove said organic vehicle coating on said particulate polymer upon dilution with water, and (d) an inert thickener agent in amounts of from about 0 to 5% by weight of the composition to retard stratification of the composition when fluidized. The nonaqueous slurries are described as useful as lubricants when dissolved in aqueous solutions.

THE INVENTION

The present invention, directed to an improved non-aqueous slurry suitable for use as a thickener or viscosifier in oil or gas drilling, fracturing, flow diversion, completion or workover fluids, comprises a water-soluble cellulose ether polymer, a water-insoluble liquid hydrocarbon, a non-ionic surfactant having an HLB of from about 7 to about 14, and an organo modified clay.

As compared to the prior art, the slurries of this invention remain pourable following storage and rapidly hydrate when added to brine or fresh water.

It has been found that the particular non-ionic surfactant used in the slurry of this invention causes rapid dispersion of the unhydrated polymer particles before they hydrate prematurely to create gel-like surfaces which, in turn, promote undesirable agglomeration and clumping. Also, said non-ionic surfactant serves as a flow modifier in the slurry to prevent the slurry's viscosity from increasing with time.

The slurries of the present invention are fast dissolving, storage stable, water soluble products which dissolve in brine or water without formation of fish-eyes or clumping.

Additionally, the slurries of the present invention have a much faster hydration rate than those of the prior art since oil or gas drilling, fracturing, flow diversion, completion and workover fluids to which the slurry has been added, achieve up to about 90% of their final viscosity in about 20 minutes.

The slurries of this invention may additionally contain a thermal stabilizer, particularly a liquid stabilizer, such as an amine.

The present invention is also directed to a process for thickening or increasing the viscosity of oil or gas drilling, fracturing, flow diversion, completion or workover fluids which comprises adding to said fluids a slurry comprising a water soluble cellulose ether polymer, a water-insoluble liquid hydrocarbon, a non-ionic surfactant having an HLB of from about 7 to about 14, and an organo modified clay.

The water soluble cellulose ether polymer of this invention is selected from one or more of hydroxyethyl cellulose, hydroxypropyl cellulose, hydroxyethylhydroxypropyl cellulose, hydroxyalkyl alkali metal carboxyalkyl cellulose derivatives, and free acid hydroxyalkyl carboxyalkyl cellulose derivatives, including hydroxyethyl carboxymethyl cellulose, hydroxymethyl carboxyethyl cellulose, hydroxymethyl carboxymethyl cellulose, hydroxypropyl carboxymethyl cellulose, hydroxypropyl carboxyethyl cellulose, hydroxypropyl carboxypropyl cellulose, hydroxybutyl carboxymethyl cellulose, and the like. The preferred alkali metal salts of these hydroxyalkyl carboxyalkyl celluloses are the sodium and the potassium salts.

The preferred cellulose ether polymer is hydroxyethyl cellulose.

These cellulose ether polymers have a bulk density of from about 17 to about 35 lbs./ft.$^3$. It is preferred that the cellulose ether polymers have a bulk density of from about 25 to about 35 lbs./ft.$^3$.

The slurry of this invention contains from about 1 to about 60, preferably from about 30 to about 50 weight percent of the water soluble cellulose ether polymer.

The water-insoluble liquid hydrocarbon suitable for use herein is selected from one or more petroleum based liquid hydrocarbons, such as mineral oils, kerosenes, diesel fuels, naphthas, and the like. Diesel fuel is the preferred liquid hydrocarbon.

The slurry of this invention contains from about 20 to about 95, preferably from about 40 to about 50 weight percent of the water-insoluble liquid hydrocarbon.

The nonionic surfactant(s) suitable for use in the slurry of this invention has a hydrophilic-lipophilic balance (HLB) of from about 7 to about 14, preferably from about 12 to about 14. The term "HLB" is well-known to the art and is explained in detail in the publication "THE ATLAS HLB SYSTEM", published in 1971 by Atlas Chemical Industries.

The nonionic surfactant has the following formula:

R—OCH$_2$CH$_2$)$_n$OH wherein R is an alkyl or aryl radical containing from 7 to about 20 carbon atoms and n is an integer of from 1 to about 15. These nonionic surfactants are commercially available under the tradename Tergitol (sold by Union Carbide Corporation). Preferably, the non-ionic surfactant contains an alkyl radical of 11 to 15 carbon atoms and n is 3, or a nonyl substituted phenol and the average value of n is 10.5.

The slurry of this invention contains from 1 to about 10, preferably from about 2 to about 5 weight percent of the nonionic surfactant.

The clays which are suitable for use in this invention are colloidal clays, such as bentonites which have been organo modified. Bentonites are well known in the art and are montmorillonite containing clays or a treated montmorillonite-containing clays having strong colloidal properties.

The slurry of this invention contains from 1 to about 4, preferably from about 2 to about 3 weight percent of an organo modified clay.

Thermal stabilizers may also be included in the slurry of this invention. These stabilizers include alkaline earth metal oxides and hydroxides, such as Mg(OH)$_2$ and MgO, and amines. Preferably, the thermal stabilizer is a liquid stabilizer, such as an amine. The amines include alkylene polyamines.

Examples of alkylene polyamines useful in practicing this invention include the following: ethylenediamine, 1,2-propylene diamine, 1,4-butylene diamine, diethylene triamine, dipropylene triamine, triethylene tetramine, tripropylene tetramine, tetraethylene pentamine, tetrapropylene pentamine, cycloalkyleneamines, such as piperazine and N-substituted piperazines, polyalkyleneimines, i.e., the higher molecular weight amines derived from alkyleneimine such as polyethyleneimines, polypropyleneimines, for example, having 50, 100 or more alkylene amino units, etc.

These include the following:

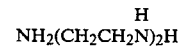

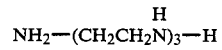

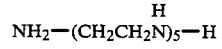

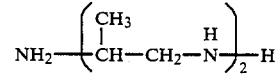

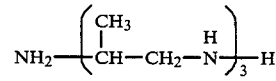

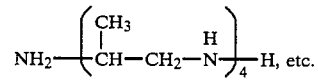

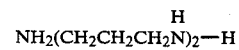

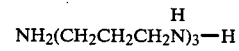

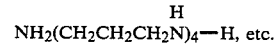

Also included within the term alkylene polyamine as used herein are substituted polyamines such as N-alkyl, N-aryl etc., compositions

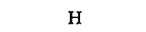

where R is alkyl, alkenyl, n is a positive number and A is alkylene. To insure water solubility of the substituted polyamines at elevated temperatures, i.e., as high as 300° F., the substituted polyamines of the invention are restricted to those wherein the alkyl or alkenyl groups contain no more than three carbon atoms.

The preferred amines are the alkylene polyamines in which the alkylene contains 1 to about 3 carbon atoms, and the most preferred amines are polyalkylene polyamines, that is, amines which contain more than 2 nitrogen atoms, such as tetraethylene pentamine.

The slurry of this invention can contain from 1 to about 10, preferably from about 2 to about 5 weight percent of the thermal stabilizer.

The slurries of this invention may also include other additives such as biocides, i.e., glutaraldehyde, polar additives, such as low molecular weight alcohols, i.e., methanol, etc., corrosion inhibitors, and the like.

The nonaqueous slurries of this invention are prepared by first preparing a concentrate of a water-insoluble liquid hydrocarbon and an organo-modified clay, combining this concentrate and a water-insoluble liquid hydrocarbon to form a suspending fluid and then adding the water-soluble cellulose ether polymer, non-ionic surfactant and any other ingredients to the suspending fluid.

EXAMPLES

The following examples serve to give specific illustrations of the practice of this invention but they are not intended in any way to limit the scope of this invention.

EXAMPLE 1

A polymer slurry was prepared according to the following procedure: 95.2 weight percent of No. 2 diesel fuel and 4.0 weight percent of an alkylammonium clay (Bentone-34, manufactured by National Lead Company) were mixed together in a mixer (a Sterling Multi-Products Multimixer) for about two minutes. 0.8 weight percent of methanol was then added and the ingredients mixed for about 10 minutes. 50 volume percent of the concentrate so formed and 50 volume percent of No. 2 diesel fuel were mixed for about 5 minutes in the mixer to form the suspending fluid. 48.0 weight percent of the suspending fluid, 50.0 weight percent of hydroxyethyl cellulose (Cellosize WP-100MH supplied by Union Carbide Corporation) having a bulk density of 33 lbs./ft.$^3$, and 2.0 weight percent of a non-ionic surfactant which is a secondary alcohol containing 3 oxyethylene units and containing 11 to 15 carbon atoms in the alcohol portion thereof, and having an HLB of 8.0, were mixed for about 20 minutes in the mixer.

The viscosity build-up of the slurry so formed was measured by adding 0.57 weight percent of the slurry to 250 ml of saturated NaCl brine solution. The mixture was stirred constantly with a Fann 35 Viscometer. The viscosity was measured every 10 minutes for one hour and the Fann dial reflection recorded.

The results are shown in Table I.

EXAMPLE 2

The procedure of preparing a slurry and measuring the viscosity thereof, described in Example 1, was exactly repeated except that the non-ionic surfactant was a primary alcohol containing 3 oxyethylene units and containing 12 to 15 carbon atoms in the alcohol portion thereof and having an HLB of 7.7.

The results are shown in Table I.

EXAMPLE 3

The procedure of preparing a slurry and measuring the viscosity thereof, described in Example 1, was exactly repeated except that the non-ionic surfactant was a secondary alcohol containing 7 oxyethylene units and containing 11 to 15 carbon atoms in the alcohol portion thereof and having an HLB of 12.1.

The results are shown in Table I.

EXAMPLE 4

The procedure of preparing a slurry and measuring the viscosity thereof, described in Example 1, was exactly repeated except that the non-ionic surfactant was a nonylphenol ethoxylate containing an average of 10.5 oxyethylene units and having an HLB of 13.6.

The results are shown in Table I.

Control A

The procedure of preparing a slurry and measuring the viscosity thereof, described in Example 1, was exactly repeated except that no surfactant was included.

The results are shown in Table I.

The data in Table I show the rapid viscosity build-up of the slurries of this invention containing the non-ionic surfactant, as compared to the slurry of Control A which does not contain a surfactant.

TABLE I

| Example | Fann dial deflection at: (minutes) | | | | | | |
|---|---|---|---|---|---|---|---|
| | 0 | 10 | 20 | 30 | 40 | 50 | 60 |
| 1 | 0 | 6 | 15 | 34.5 | 39 | 40.5 | 41 |
| 2 | 0 | 6.5 | 22 | 39 | 40 | 42.5 | 42 |
| 3 | 0 | 11 | 39.5 | 41.5 | 41.5 | 41.5 | 40 |
| 4 | 0 | 32.5 | 38 | 37.5 | 37.0 | 36.5 | 36.5 |
| Control A | 0 | 9 | 13 | 15.5 | 17.5 | 19.5 | 21 |

EXAMPLES 5 TO 8

The following Examples 5 to 8 demonstrate the effect of a non-ionic surfactant on a slurry containing a thermal stabilizer, i.e., tetraethylenepentamine.

EXAMPLE 5

A polymer slurry was prepared by the procedure as described in Example 1, except that 49.1 weight percent of the suspending fluid, 45.0 weight percent of the hydroxyethyl cellulose polymer, 2.0 weight percent of the surfactant described in Example 1, and 3.9 weight percent of tetraethylene pentamine were mixed for about 20 minutes in the mixer.

The viscosity build-up of the slurry was measured as described in Example 1.

The results are shown in Table II.

EXAMPLE 6

The procedure of preparing a slurry and measuring the viscosity thereof, described in Example 5, was exactly repeated except that the non-ionic surfactant was that of Example 2, i.e., a primary alcohol containing 3 oxyethylene units and containing 12 to 15 carbon atoms in the alcohol portion thereof.

The results are shown in Table II.

EXAMPLE 7

The procedure of preparing a slurry and measuring the viscosity thereof, described in Example 5, was exactly repeated, except that the non-ionic surfactant was that of Example 3, i.e., a secondary alcohol containing 3 oxyethylene units and containing 11 to 15 carbon atoms in the alcohol portion thereof.

The results are shown in Table II.

EXAMPLE 8

The procedure of preparing a slurry and measuring the viscosity thereof, described in Example 5, was exactly repeated except that the non-ionic surfactant was that of Example 4, i.e., a nonylphenol ethoxylate containing an average of 10.5 oxyethylene units.

The results are shown in Table II.

Control B

The procedure of preparing a slurry and measuring the viscosity thereof, described in Example 5, was exactly repeated, except that no surfactant was included.

The results are shown in Table II.

The data in Table II show the rapid viscosity build-up of the slurries of this invention containing the non-ionic surfactant, as compared to the slurry of Control B which does not contain a surfactant.

TABLE II

| | Fann dial deflection at: (minutes) | | | | | | |
|---|---|---|---|---|---|---|---|
| Example | 0 | 10 | 20 | 30 | 40 | 50 | 60 |
| 5 | 0 | 12 | 17.5 | 20 | 22.5 | 24.5 | 26.5 |
| 6 | 0 | 32 | 35 | 37 | 37 | 37.5 | 37.5 |
| 7 | 0 | 30 | 34 | 35 | 35 | 35 | 35.5 |
| 8 | 0 | 32 | 35 | 35.5 | 36.5 | 36 | 36 |
| Control B | 0 | 11 | 13 | 15.5 | 18.5 | 22.5 | 25 |

EXAMPLES 9 TO 12

The following Examples 9 to 12 demonstrate the effect of a non-ionic surfactant on a slurry containing a thermal stabilizer, i.e., $Mg(OH)_2$.

EXAMPLE 9

A polymer slurry was prepared by the procedure as described in Example 1, except that 49.1 weight percent of the suspending fluid, 45.0 weight percent of the hydroxyethyl cellulose polymer, 2.0 weight percent of the surfactant described in Example 1, and 3.9 weight percent of $Mg(OH)_2$, were mixed for about 20 minutes in the mixer.

The viscosity build-up of the slurry was measured as described in Example 1.

The results are shown in Table III.

EXAMPLE 10

The procedure of preparing a slurry and measuring the viscosity thereof, described in Example 9, was exactly repeated except that the non-ionic surfactant was that of Example 2, i.e., a primary alcohol containing 3 oxyethylene units and containing 12 to 15 carbon atoms in the alcohol portion thereof.

The results are shown in Table III.

EXAMPLE 11

The procedure of preparing a slurry and measuring the viscosity thereof, described in Example 9, was exactly repeated except that the non-ionic surfactant was that of Example 3, i.e., a secondary alcohol containing 7 oxyethylene units and containing 11 to 15 carbon atoms in the alcohol portion thereof.

The results are shown in Table III.

EXAMPLE 12

The procedure of preparing a slurry and measuring the viscosity thereof, described in Example 9, was exactly repeated except that the non-ionic surfactant was that of Example 4, i.e., a nonylphenol ethoxylate containing an average of 10.5 oxyethylene units.

The results are shown in Table III.

Control C

The procedure of preparing a slurry and measuring the viscosity thereof, described in Example 9, was exactly repeated except that no surfactant was included.

The results are shown in Table III.

The data in Table III show the rapid viscosity build-up of the slurries of this invention containing the non-ionic surfactant as compared to the slurry of Control C which does not contain a surfactant.

TABLE III

| | Fann dial deflection at: (minutes) | | | | | | |
|---|---|---|---|---|---|---|---|
| Example | 0 | 10 | 20 | 30 | 40 | 50 | 60 |
| 9 | 0 | 31 | 35 | 35 | 35 | 34 | 33.5 |
| 10 | 0 | 31 | 34 | 34 | 34 | 33.5 | 33 |
| 11 | 0 | 32 | 36 | 36 | 35.5 | 35.5 | 35 |
| 12 | 0 | 34.5 | 37.5 | 37.5 | 36.5 | 36.5 | 35.5 |
| Control C | 0 | 9 | 12.5 | 14.5 | 16.5 | 18.5 | 20.5 |

EXAMPLES 13 TO 16

The following Examples 13 to 16 demonstrate the effect of a non-ionic surfactant on a slurry containing a thermal stabilizer, i.e., MgO.

EXAMPLE 13

A polymer slurry was prepared by the procedure as described in Example 1 except that 49.1 weight percent of the suspending fluid, 45.0 weight percent of the hydroxyethyl cellulose, 2.0 weight percent of the surfactant described in Example 3, i.e., a secondary alcohol containing 7 oxyethylene units and 11 to 15 carbon atoms in the alcohol portion thereof; and 3.9 weight percent of MgO, were mixed for about 20 minutes in the mixer.

The viscosity build-up of the slurry was measured as described in Example 1.

The results are shown in Table IV.

EXAMPLE 14

The procedure of preparing a slurry and measuring the viscosity thereof, described in Example 13, was exactly repeated except that the non-ionic surfactant was that of Example 4, i.e., a nonylphenol ethoxylate containing an average of 10.5 oxyethylene units.

The results are shown in Table IV.

EXAMPLE 15

The procedure of preparing a slurry and measuring the viscosity thereof, described in Example 13, was exactly repeated except that the non-ionic surfactant was a nonylphenol ethoxylate containing an average of 4 oxyethylene units and having an HLB of 8.9.

The results are shown in Table IV.

EXAMPLE 16

The procedure of preparing a slurry and measuring the viscosity thereof, described in Example 13, was exactly repeated except that the non-ionic surfactant was a primary alcohol containing 7 oxyethylene units and containing 12 to 15 carbon atoms in the alcohol portion thereof.

The results are shown in Table IV.

Control D

The procedure of preparing a slurry and measuring the viscosity thereof, described in Example 13, was exactly repeated except that no surfactant was included.

The results are shown in Table IV.

The data in Table IV shown the rapid viscosity build-up of the slurries of this invention containing the non-ionic surfactant, as compared to the slurry of Control D which does not contain a surfactant.

TABLE IV

| Example | Fann dial deflection at: (minutes) | | | | | | |
|---|---|---|---|---|---|---|---|
| | 0 | 10 | 20 | 30 | 40 | 50 | 60 |
| 13 | 0 | 31.5 | 39 | 39 | 38.5 | 38 | 38 |
| 14 | 0 | 34 | 37.5 | 38 | 38 | 38 | 38.5 |
| 15 | 0 | 15 | 16.5 | 22 | 24.5 | 26 | 28 |
| 16 | 0 | 34 | 37.5 | 38 | 38 | 38 | 38.5 |
| Control D | 0 | 5 | 5.5 | 5.5 | 5.5 | 6 | 6 |

What is claimed is:

1. A non-aqueous slurry suitable for use as a thickener or viscosifier in oil or gas drilling, fracturing, flow diversion, completion or workover aqueous fluids, which slurry consists essentially of:
   (1) from about 1 to about 60 weight percent of a hydroxyethyl substituted, water-soluble cellulose ether polymer;
   (2) from about 20 to about 95 weight percent of a water-insoluble liquid hydrocarbon;
   (3) from 1 to about 10 weight percent of a non-ionic surfactant having an HLB of from about 7 to 14, represented by the structural formula:

$R(OCH_2CH_2)_nOH$ wherein:
   R is an alkyl or aryl radical containing from 7 to about 20 carbon atoms, and
   n is from 1 to about 15; and
   (4) from 1 to about 4 weight percent of an organo modified colloidal clay.

2. A non-aqueous slurry as defined in claim 1 which contains from about 30 to about 50 weight percent of the water-soluble cellulose ether polymer.

3. A non-aqueous slurry as defined in claim 1 wherein said non-ionic surfactant has an HLB of from about 12 to 14.

4. A non-aqueous slurry as defined in claim 1, wherein R is an alkyl of 11 to 15 carbon atoms and n is an integer of from 3 to 12.

5. A non-aqueous slurry as defined in claim 1, wherein R is a nonyl substituted phenol and n has an average value of 10.5.

6. A non-aqueous slurry as defined in claims 4 or 5 which contains about 50 weight percent of hydroxyethyl cellulose and about 2 weight percent of said surfactant.

7. A non-aqueous slurry as defined in claim 1, wherein the water-insoluble hydrocarbon liquid is a petroleum based liquid hydrocarbon.

8. A non-aqueous slurry as defined in claim 7, wherein the hydrocarbon liquid is selected from mineral oil, kerosene, diesel fuel and naphthas.

9. A non-aqueous slurry as defined in claim 1 which contains a thermal stabilizer selected from an alkaline earth metal oxide or hydroxide or an alkylene polyamine.

10. A non-aqueous slurry as defined in claim 9, wherein the thermal stabilizer is an alkaline earth metal oxide or hydroxide.

11. A non-aqueous slurry as defined in claim 10, wherein the stabilizer is $Mg(OH)_2$ or $MgO$.

12. A non-aqueous slurry as defined in claim 9, wherein the amine is an alkylene polyamine.

13. A non-aqueous slurry as defined in claim 12, wherein the alkylene polyamine contains 1 to 3 carbon atoms in the alkylene and the amine contains more than 2 nitrogen atoms.

14. A non-aqueous slurry as defined in claim 13, wherein the alkylene polyamine is tetraethylene pentamine.

15. A non-aqueous slurry as defined in claims 12 or 13 or 14 which contains from about 1 to about 10 weight percent of polyamine.

16. A non-aqueous slurry as defined in claims 1 or 9 which contains a low molecular weight alcohol.

17. A non-aqueous slurry as defined in claim 16 wherein the alcohol is methanol.

18. A process for thickening oil or gas drilling, fracturing, flow diversion, completion or workover aqueous fluids which comprises adding to such fluids a non-aqueous slurry consisting essentially of:
   (1) from about 1 to about 60 weight percent of a hydroxyethyl substituted, water-soluble cellulose ether polymer;
   (2) from about 20 to about 95 weight percent of a water-insoluble liquid hydrocarbon;
   (3) from 1 to about 10 weight percent of a non-ionic surfactant having an HLB of from about 7 to 14, represented by the structural formula:

$R(OCH_2CH_2)_nOH$ wherein:
   R is an alkyl or aryl radical containing from about 7 to about 20 carbon atoms, and
   n is from about 1 to about 15; and
   (4) from 1 to about 4 weight percent of an organo modified colloidal clay.

19. A process as defined in claim 18 wherein the water-soluble cellulose ether polymer has a bulk density of from about 25 to about 35 lbs/ft³.

20. A process as defined in claim 18 which contains from about 30 to about 50 weight percent of the water-soluble cellulose ether polymer.

21. A process as defined in claim 18 wherein said non-ionic surfactant has an HLB of from about 12 to 14.

22. A process as defined in claim 18 wherein R' is an alkyl of 11 to 15 carbon atoms and n is from 3 to 12.

23. A process as defined in claim 18 wherein R is a nonyl substituted phenol and n has an average value of 10.5.

24. A process as defined in claims 22 or 23 which contains about 50 weight percent of hydroxyethyl cellulose and about 2 weight percent of said surfactant.

* * * * *